United States Patent [19]

Leu

[11] Patent Number: 4,570,122

[45] Date of Patent: Feb. 11, 1986

[54] MAGNETIC EXPLORATION WITH REDUCTION OF MAGNETIC DATA TO THE EQUATOR

[75] Inventor: Lei-Kuang Leu, Dhahran, Saudi Arabia

[73] Assignee: Mobil Oil Corporation, New York, N.Y.

[21] Appl. No.: 480,192

[22] Filed: Mar. 30, 1983

[51] Int. Cl.$^4$ .................. C01V 3/08; C01V 3/165
[52] U.S. Cl. ........................... 324/345; 324/331
[58] Field of Search ............................. 324/331, 345

[56] References Cited

PUBLICATIONS

Jensen; Homer, The Airborne Magnetometer, *Scientific American*, Jun. 1961, pp. 151–162.

Primary Examiner—Gerard R. Strecker
Attorney, Agent, or Firm—Alexander J. McKillop; Michael G. Gilman; Charles J. Speciale

[57] ABSTRACT

A method of reducing magnetic data recorded at latitudes close to the magnetic equator to the equator is disclosed. The result corrects magnetic field anomalies recorded with respect to geologic anomalies to more closely reflect the shape of the geologic anomalies. In the preferred embodiment, reduction-to-the-equator is carried out in the wave number domain using an operator $$H_E(u,v) = \frac{u^2}{(liu + miv + ns)(Liu + Miv + Ns)}.$$

10 Claims, 11 Drawing Figures

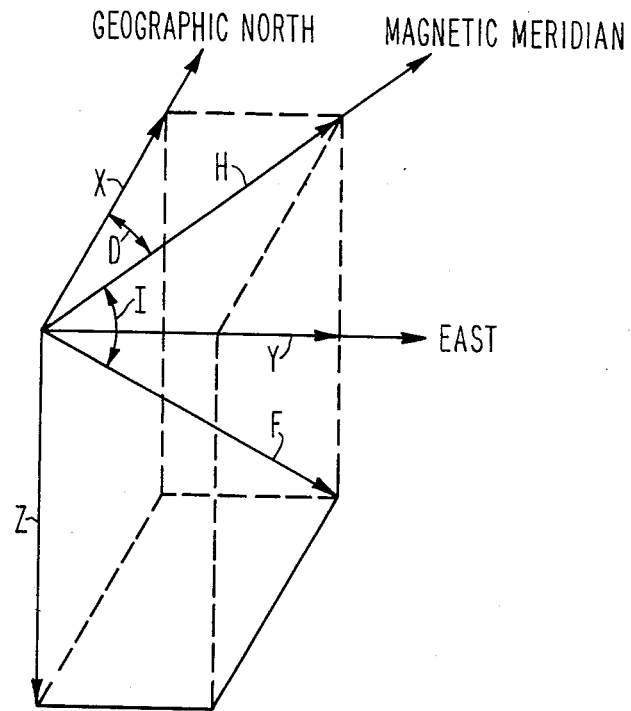
_Fig. 3_
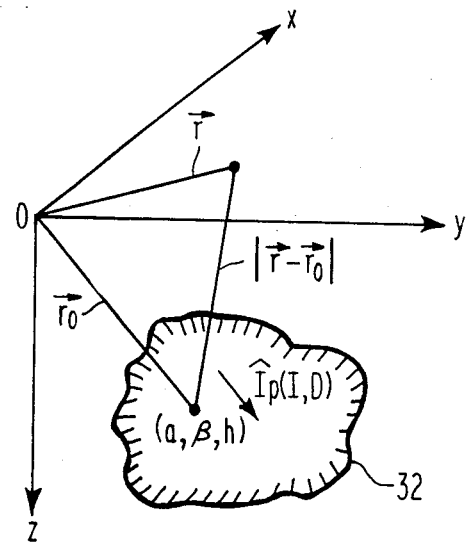
_Fig. 3A_

MAGNETIC EXPLORATION WITH REDUCTION OF MAGNETIC DATA TO THE EQUATOR

FIELD OF THE INVENTION

This invention relates generally to the field of exploration of the earth by measurement of its local magnetic field. More particularly, the invention relates to a method in which the records of anomalies in the earth's magnetic field resulting from geologic discontinuities can be corrected to correspond more closely to the actual magnetic structure of the earth.

BACKGROUND OF THE INVENTION

It has been known for many years that detailed knowledge of the magnetic field of the earth at particular locations is of interest and of value in determining the geological structure of the earth. While the global magnetic field varies generally from the north magnetic pole to the south magnetic pole, local variations in the global magnetic field can be used as clues to deduce the underlying geological structure of the earth and this can be used in exploration for oil, gas and other minerals.

It is well understood that oil and gas are typically found in beds of sedimentary rock. Sedimentary rock is generally rock which has been washed down from mountain peaks and the like and deposited into beds over many millenia of time. Typically, the sedimentary rock does not have a strong magnetic field, while igneous rock, such as the rock from which the sediments are washed, possesses a stronger magnetic field. Accordingly, if one measures the earth's magnetic field above a bed of sedimentary rock deposited over a layer of igneous rock, such as the ocean bed, the intensity of the magnetic field is generally the sum of the earth's global or "ambient" field plus a term proportional to the distance of the underlying igneous rock from the magnetometer used to record the magnetic field. If one measures the field at spaced locations along a line of exploration and finds that the magnetic field intensity varies along that line, one may assume that the points at which the magnetic field is higher correspond to points where the magnetic "basement" of igneous rock more closely approaches the magnetometer. If spaced lines over an area of interest are thus explored, a map can be constructed yielding an approximate picture of the contours of the "basement". This provides a corresponding topological map of the lower contour of the sedimentary rock, which can be compared to an ordinary map to yield a cross-sectional view of the thickness of the sediments along the lines of exploration and hence indicating, among other things, where more or less sedimentary rock is present, which maps can then be interpreted by geologists in the search for oil and gas.

Accordingly, it has become increasingly common that magnetic surveys are performed. The usual practice is simply to fly an airplane towing a magnetometer behind it along spaced parallel lines of exploration, typically a kilometer apart, and record the intensity of the earth's magnetic field at locations spaced, again typically a kilometer apart, along the lines. Cross lines are also flown, for example, spaced six or seven kilometers from one another, to insure that no overall variation in the field goes undetected. The values of the magnetic field thus generated can be plotted on paper; if contour lines connecting points of equal magnetic field are drawn, an overall picture of the structure of the magnetic basement of the earth's surface at that point is the result.

The prior art shows numerous processing methods for increasing the accuracy with which the displays just described correspond to the actual magnetic structure of the earth. One important method of such processing is referred to as reduction-to-the-pole processing. This method refers to the well known fact that the accuracy of the results of plotting the measurements of the magnetic field with respect to the actual geologic structure is influenced by the magnetic latitude at which the measurements are taken. That is to say, the magnetic field recorded with respect to a particular geologic anomaly, i.e., local variation from the mean amount of magnetic material present in the earth's crust at the area of exploration, is influenced by the latitude with respect to the magnetic equator at which the survey is flown. If the anomaly is located at or near the north or south magnetic pole, and corresponds to an increase in magnetic material in the area of exploration, the magnetic field will show its peak value with respect to the ambient field when the magnetometer is directly over the geologic body producing the magnetic anomaly. As the exploration moves toward the magnetic equator, the simple peak shape of the anomaly when recorded with respect to a magnetic body at the pole becomes instead a positive peak and a negative trough in the magnetic field recorded. The relative intensities of the peak and trough vary with latitude. Furthermore, the zero point of the paired peaks does not in general coincide with the epicenter of the magnetic material in the geologic body. Accordingly, the displays of magnetic data taken at points other than at the poles are distorted and do not directly represent the geologic structure of the earth. Finally, at the equator, an increase in magnetic material becomes a trough centered over the epicenter of the magnetic material in the body.

The prior art shows methods by which such displays can be processed mathematically so that the displays generated thereby are comparable to displays which would be generated if the anomaly were located instead at the pole, and hence so that the region of greatest depature of the local magnetic field from the earth's ambient field appears to be located directly over the magnetic body producing the anomaly in the magnetic field. One such method, known as reduction-to-the-pole, is well understood in the prior art, and has been extensively practiced thereby. However, it has been generally recognized that the reduction-to-the-pole method which is commonly used is only useful for data recorded at magnetic latitudes greater than about 25° from the magnetic equator. At latitudes less than about 25°, the filtering method generally employed becomes mathematically unstable and the data is undesirably distorted leading to poor correspondence with the underlying geologic structure. The art has recognized the need for an improvement on the reduction-to-the-pole method, particularly in the region of the magnetic equator, and various methods have been tried. (See, for example, Pearson et al, *Reduction-to-the-Pole of Low Latitude Magnetic Anomalies,* a paper which was presented at the Fall, 1982, meeting of the Society of Exploration Geophysicists in Dallas, Tex. While not prior art against the present application, this paper is instructive in that it expands upon the difficulty of application of reduction-to-the-pole techniques near the magnetic equator, and exemplifies the need of the art for improved methods of processing this magnetic data.)

However, none of these methods have been particularly successful and they have generally involved compromises in the signal-to-noise ratio of the recorded data, increased computation time, or the like.

OBJECTS OF THE INVENTION

Accordingly, it is an object of the invention to provide a method of processing magnetic data recorded within about 25° of latitude above or below the magnetic equator so as to yield a more realistic picture of the magnetic structure of the earth.

It is accordingly an object of the invention to provide a method of processing magnetic data recorded in the vicinity of the magnetic equator so that anomalies in the magnetic field recorded correspond to the geologic body which causes them.

It is a further object of the invention to provide a way in which magnetic data recorded with respect to geologic anomalies in the vicinity of the magnetic equator can be reprocessed to yield a map resembling one which would be generated if the data had been recorded with respect to geologic anomalies near the magnetic poles.

SUMMARY OF THE INVENTION

The present invention satisfies the needs of the art and objects of the invention mentioned above by its provision of a reduction-to-the-equator method. In the method of the invention, magnetic data recorded with respect to geologic anomalies within about 25° of the magnetic equator is processed so as to look as it would have if it had been recorded at the equator, in a manner analogous to processes performed in the reduction-to-the-pole method. However, the reduction-to-the-equator method of the invention avoids the deficiencies of the reduction-to-the-pole method with respect to data recorded near the magnetic equator.

Broadly, the method of the invention may be characterized as exploiting the trigonometric relationship between the inclination and declination of the earth's magnetic field at the magnetic equator and at the latitude where the data was recorded. An operator is generated which provides a transfer function which when applied to the data results in data which corresponds much more closely to the actual geologic anomaly producing the magnetic anomaly. In the preferred embodiment, the operator modifies the data after transformation to the wave number domain.

BRIEF DESCRIPTION OF THE DRAWINGS

The invention will be better understood if reference is made to the accompanying drawings, in which:

FIG. 3 is a diagram illustrating the notation of the components of the magnetic field vector;

FIG. 3A shows the notation used to describe the magnetic scalar potential due to a geologic anomaly;

DESCRIPTION OF THE PREFERRED EMBODIMENTS

Figure 1:
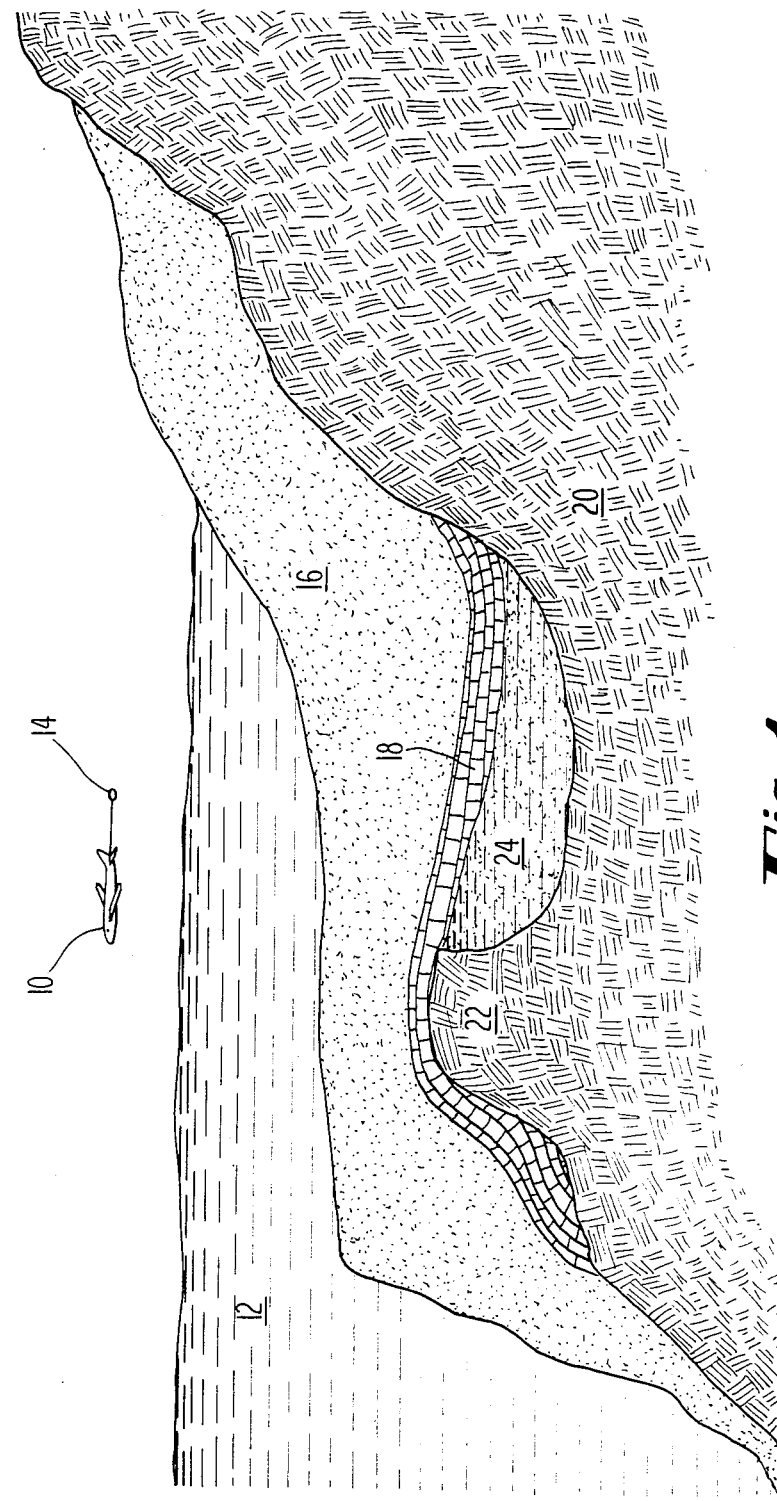
FIG. 1 shows schematically a magnetic exploration expedition.

FIG. 1 shows schematically the way in which magnetic exploration of the earth is carried out. In the example shown, an exploration airplane 10 is flying over an ocean 12 towing a magnetometer 14 behind it. The magnetometer 14 outputs a signal representative of the intensity of the earth's magnetic field at its location. Typically, this value will be logged with respect to the location of the plane at spaced points along the line of flight, for example at locations spaced 100 meters apart. At the end of each line, the plane turns around and flies back again along a parallel line, spaced one kilometer away, and so on. Tie lines are also flown at intervals of perhaps six or seven kilometers perpendicular to the flight lines. This helps to establish cross-reference values to insure that the magnetometer does not drift over time, and the like.

In the example shown in FIG. 1 the airplane is flying over the ocean 12. The ocean bed may comprise a bed 16 of generally sedimentary rock underlying which is a layer of a different sort of rock 18, and under all of which is the magnetic basement of the earth 20. As discussed above, typically the magnetic basement 20, being igneous, is magnetic whereas the sedimentary rock 16 and 18 which is typically washed down from the tops of mountains and the like over millenia, is nonmagnetic. Accordingly, the magnetometer readings will exhibit variation from the mean if any geologic anomalies are present which tend to increase or decrease the total magnetic field at the location of exploration. For example, an upthrust 22 in the igneous rock 20 shown in FIG. 1 would generate a higher magnetic field which could be detected by the magnetometer 14 when above the upthrust 22. An area 24 which does not comprise the igneous rock 20 might be detected as a region of low magnetic intensity. If the band 18 of deposits were then detected, e.g., by seismic exploration or other conventional methods, it might be realized that beneath this band 18 was a region 24 of sedimentary rock which was confined by the band 18 and by the igneous rock 20 and by the upthrust portion 22, which might form a reservoir for the containment of oil. Such exploration of off-shore areas, particularly in the continental shelf areas which surround most of the continents, is becoming increasingly common. Magnetic surveys are proving to be of great use in this endeavor, particularly in defining the lower limits of the sedimentary beds within which are found oil and gas. The art will recognize that magnetic prospecting has also proven its worth in other areas, for example, the overthrust belt found in the Rocky Mountains of North America.

Magnetic data may also be useful in understanding ambiguities in a seismic record. For example, in seismic data records, a volcanic inclusion in a sedimentary bed appears very similar to a coral beef buried in a sedimentary bed, in that both show up as discontinuities in the seismic record. However, location of a reef is very desirable for oil prospecting purposes because the highly porous reef structure is a very good location in which to find oil. The volcanic inclusion, on the other hand, is a very poor choice for oil prospecting because it has a non-porous structure and hence cannot be expected to contain oil. The magnetic methods described above can be used to distinguish between volcanic inclusions and reefs because the volcanic inclusion, being igneous rock, will typically be magnetic, whereas the reef will not.

At the conclusion of the survey as shown in FIG. 1, one is left with a series of values for the magnetic field at spaced grid points. If these are then marked on a map of the area and lines are drawn connecting points of equal magnetic intensity, magnetic contours emerge which operate much as does a contour map to define the shape of the upper surface of the magnetic "basement" which underlies the sedimentary rock which otherwise cover the earth's surface and the ocean bed.

However, as noted above, simply displaying the magnetic data in this manner is somewhat misleading with respect to the shape of the magnetic basement because anomalies in the magnetic field are not located directly over geologic anomalies such as the upthrust 22 except near the pole and near the equator. This will now be discussed in detail.

To a first approximation, the magnetic field of the earth can be considered as that of the uniformly polarized sphere. At the north magnetic pole, the field is vertical pointing inward, and at the south magnetic pole the field is vertical pointing outward. The direction of the field with respect to the surface of the earth varies gradually from vertical inward at the magnetic north pole to horizontal northward at the magnetic equator to vertical outward at the magnetic south pole.

These variations in the direction of the field with respect to one's position on the earth's surface cause large changes in the magnetic field anomaly caused by a geologic anomaly.

Figure 2:
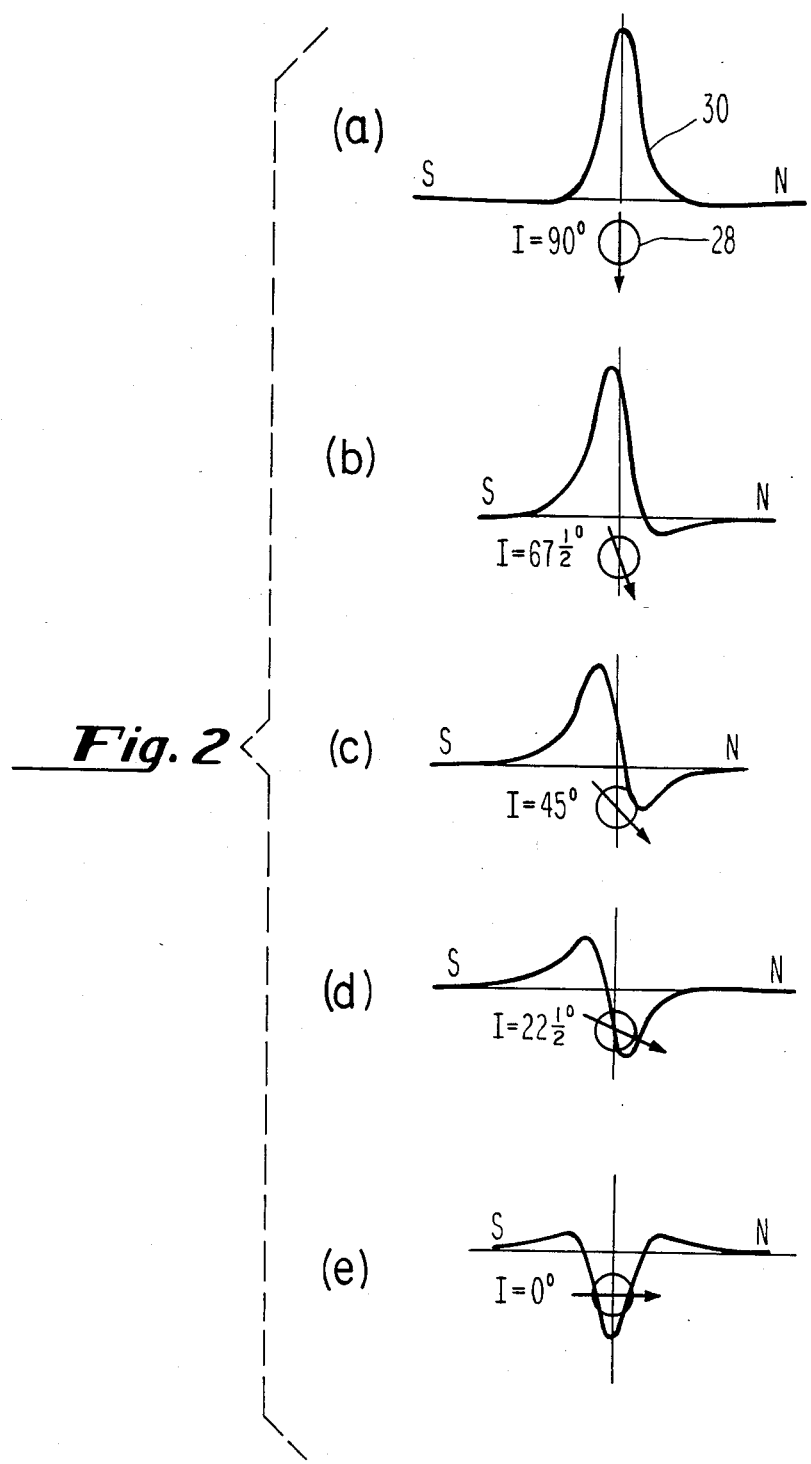
FIG. 2 illustrates how the variation in magnetic field caused by a geologic anomaly varies with respect to magnetic latitude.

This is shown in FIG. 2 which comprises FIGS. 2a through 2e. These diagrams show the calculated variation of the total field anomaly caused by a polarized sphere 28 with respect to various inclinations of the direction of magnetization. FIG. 2a shows the situation at high magnetic latitudes, near the north pole where the inclination I of the field vector is directly inward, i.e., at 90° to the surface of the earth. There the magnetic field anomaly graphed at 30 is centered directly over the magnetized sphere 28 and is a simple maximum with very weak symmetrical flanking minima. At latitude 67.5° N in FIG. 2b, the figure becomes unsymmetrical, the maximum amplitude is lower, its peak is shifted slightly southwardly of the center of the sphere and a negative component begins to develop on the north side. At latitude 45° N in FIG. 2c the maximum amplitude is further reduced, the peak is shifted further toward the south and the negative anomaly to the north is quite strong. At latitude 22.5° N (FIG. 2d) the curve is nearly symmetrical with positive and negative parts of roughly equal amplitude; however, the center of the sphere is not centered with respect to the zero point of the intensity. Finally, at the magnetic equator, I=0°, the direction of polarization is horizontal; the anomaly shows up as a strong minimum in the local magnetic field with symmetrical flanking positive features, as shown by FIG. 2e. Thus, the magnetic anomaly which is a simple positive anomaly at high magnetic latitudes is approximately turned inside out to become a negative anomaly at low magnetic latitudes, i.e., near the magnetic equator. If the process were continued toward the south pole, the diagrams would be repeated with left to right reversal. (The above figures are after Nettleton, "Elementary Gravity and Magnetics for Geologists and Seismologists", *Society of Exploration Geophysicists*, 1971). Thus, for example, if one looks at a diagram showing the contours of equal magnetic field, and observes a "peak" in the field next to a "valley" and notes that the anomaly was located at a magnetic latitude about 45° N, one can presume that the geologic feature causing the anomaly is actually centered between the positive and negative going features, as shown by FIG. 2c. The prior art shows methods for processing the magnetic data obtained in operations such as described above in connection with FIG. 1 so that the representation of the magnetic anomalies more closely corresponds to the actual location of the physical anomalies as it does at the pole, so that in turn the knowledge of the magnetic sub-basement structure of the earth becomes more accurate and accordingly more useful.

The prior art reduction-to-the-pole method will be discussed after the following explanation of some additional concepts and terminology.

Mentioned above was the "inclination" of the earth's field, which is the angle the magnetic field vector makes with respect to the horizontal. The magnetic field vector at any point on the surface of the earth also makes an angle with respect to the true north direction, and it is this direction which is typically noted on navigational compasses and the like. This second angle is called the "declination" and use of this term is found throughout the discussion of magnetic data processing methods which follows. It would, of course, be possible to make reference instead to magnetic north so that the declination would be zero, but as is well known, magnetic north moves over time and its relation to true north varies from place to place. Accordingly, it is deemed more useful always to refer to the declination, understanding that this means the angle the magnetic field vector makes on the earth's surface with respect to true north. This is shown by FIG. 3 in which the three conventional Cartesian coordinates X, Y and Z correspond respectively to geographical north, geographical east, and radially downward into the earth. The magnetic meridian H forms the angle of declination D with the geographical north vector on the X-axis, while the total magnetic force vector F forms the angle of inclination I with the horizontal. The vector F thus shows the direction in which a free compass needle on the surface of the earth will actually point, whereas the angle D shows the horizontal component of this vector, the angle of the magnetic meridian with respect to geographic north.

At any point on the earth, the magnetic field measured is the vector sum of the earth's ambient field and the additional magnetic field introduced by any magnetic anomaly in the area, which are typically caused by geographic discontinuities or sudden changes in the magnetic makeup of the earth at that point. In general, one can assume that the inclination and declination of the magnetic anomaly produced by a geometric anomaly is the same as the inclination and declination of the earth's field at that point; in general, only local variations in intensity are significant.

Referring now to FIG. 3a, the magnetic scaler potential $A(r)$ caused by a geometric anomaly 32 can be expressed as follows:

$$A(r) = - \iiint \vec{I_p} \cdot \vec{\nabla} \frac{1}{|\vec{r} - \vec{r_o}|} d\alpha d\beta dh, \qquad (1)$$

where $$\vec{\nabla} = \vec{i}\frac{\partial}{\partial x} + \vec{j}\frac{\partial}{\partial y} + \vec{k}\frac{\partial}{\partial z}$$

$$\vec{I_p} \cdot \vec{\nabla} = |I_p| \left( l\frac{\partial}{\partial x} + m\frac{\partial}{\partial y} + n\frac{\partial}{\partial z} \right)$$

and l = cos (I) cos (D);
m = cos (I) sin (D);
n = sin (I);
I = angle of inclination; and
D = angle of declination.

The magnetic field H(r) caused by the anomaly 32 is then $$H(r) = -\frac{\partial}{\partial t} A(r) \qquad (2)$$

where t is the direction of the ambient field. Equation (2) can then be expanded as $$H(r) = -\left( L\frac{\partial}{\partial x} + M\frac{\partial}{\partial y} + N\frac{\partial}{\partial z} \right) A(r) \qquad (3)$$

where
L = cos I$_o$ cos D$_o$;
M = cos I$_o$ sin D$_o$;
N = sin D$_o$;
I$_o$ = inclination of the earth's ambient field; and
D$_o$ = declination of the earth's ambient field.

As discussed above, magnetic exploration results in a matrix of points corresponding to the intensity of the magnetic field at these points on the earth's surface. Typically, it is convenient to perform further processing of this data in the frequency domain. Accordingly, the matrix of points located with respect to coordinates (x,y) are Fourier-transformed to yield values F(u,v). The expression for this, which is the Fourier transformation of equation (3) appears at equation (4) below.

$$F(u,v) = 2\pi |I_p| (liu + miv + ns)(Liu + Miv + Ns) \cdot \qquad (4)$$

$$\left( \frac{1}{s} \iiint e^{-(sh+iu\alpha+\beta iv)} d\alpha d\beta dh \right).$$

It is instructive to consider the sources of the terms of equation (4). The term (liu+miv+ns) refers to the magnetic field of the magnetized body, i.e., the geologic anomaly. (Note that s$^2$=u$^2$+v$^2$). The term (Liu+Miv+Ns) refers to the earth's ambient field. Typically, as noted above, it is assumed that l=L, m=M, and n=N. This is very convenient in processing, as will become apparent. The term $$\frac{1}{s} \iint \int e^{-(sh+iu\alpha+\beta iv)} d\alpha d\beta dh$$

relates to the geometry of the body and is independent of the local magnetic field, as will be clear from consideration of FIG. 3A and the discussion above.

At the pole, where I=90° and D=0°, because the cos I terms found in the definition of l, L, m and M are all equal to zero, equation (4) reduces to equation (5).

$$F_p(u,v) = |I_p|2\pi s \int \int \int e^{-(sh+iu\alpha+iv\beta)} d\alpha d\beta dh \qquad (5)$$

Basically, the first two terms of equation (4), relating to the magnetic field output by the magnetized body and the ambient field, respectively, reduce to s$^2$, leaving only the third term, descriptive of the body's geometry.

Accordingly, to transform a series of magnetic data points from a difficult to understand version, not easily related to the geologic facts, as shown in FIG. 2c, to a simple and geographically centered view, as in FIG. 2a, the reduction-to-the-pole operator H(u,v) is defined. This operates as a filter in the wave number (Fourier-transformed) domain and is defined as H(u,v)=F$_p$(U,v)/F(u,v), so that $$H(u,v) = \frac{s^2}{(liu + miv + ns)(Liu + Miv + Ns)} \qquad (6)$$

This operator can be evaluated. Values for L, M and N are all known from overall surveys of the earth's ambient field, as are published by the government from time to time, and it is assumed, as mentioned above, that these are equal to l, m and n, respectively. Values for u and v are calculated in the generation of the Fourier-transformed version of the data, while s$^2$ is equal to u$^2$+v$^2$. Accordingly, the reduction-to-the-pole operator H(u,v) is fully defined. As it is well understood in the art, H(u,v) can be used in the wave number domain to operate upon magnetic data recorded to generate a more realistic magnetic map in which magnetic field anomalies are located over the geologic anomalies which produce them.

The reduction to the pole method just described gives good results at magnetic latitudes above about 25°. However, below this area, the operator H(u,v) described by equation (6) becomes unstable. Essentially, the application of the operator to the total field as described by equation (4) becomes perilously close to the mathematically forbidden operation of dividing by zero. It is well understood in the art (see the Pearson et al paper referred to above) that the reduction-to-the-pole method is unreliable at latitudes near the magnetic equator. Accordingly, the present invention proposes instead to reduce magnetic data to the equator; that is, to design an operator corresponding to that defined by equation (6) which can reduce data looking like, for example, that shown in FIG. 2d to that shown in FIG. 2e where the magnetic anomaly graphed is centered over the geometric anomaly which produces it.

Figure 4:
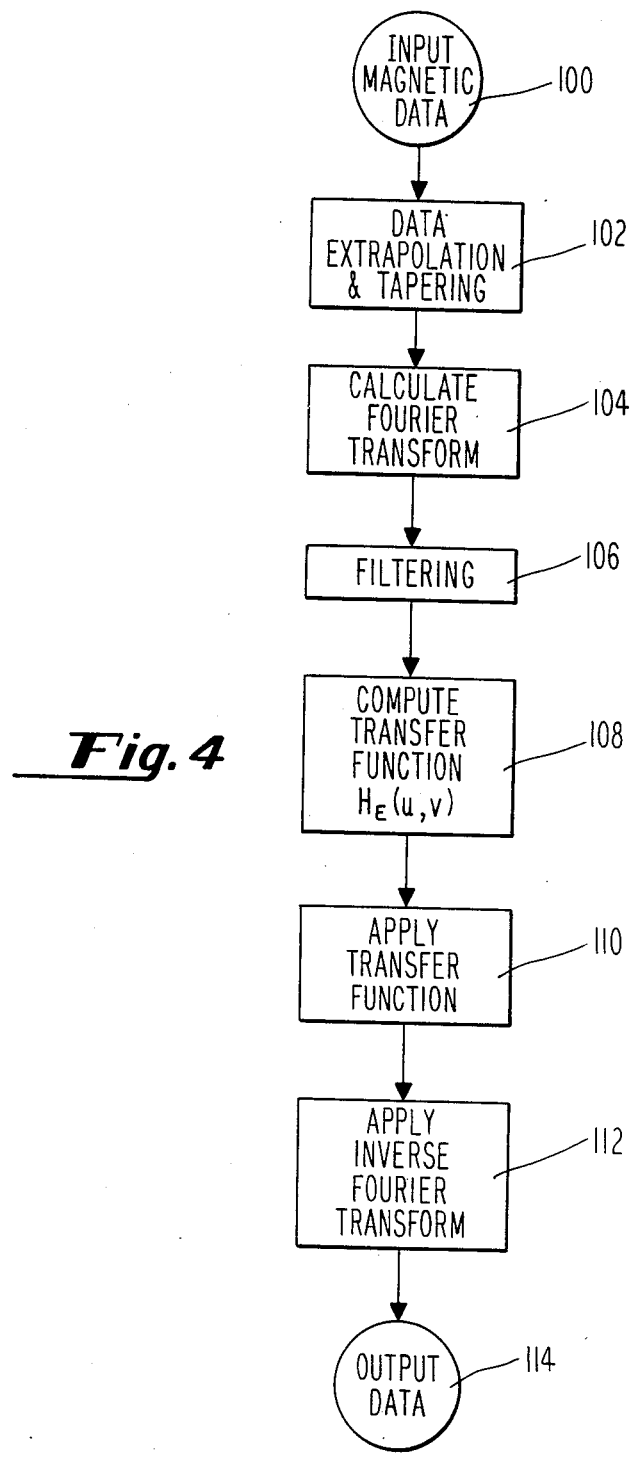
FIG. 4 shows a flowchart of the method of the invention.

FIG. 4 shows a flowchart of the process of the invention, and will be briefly described here; a more detailed description of the process appears below.

At 100, the magnetic data to be processed according to the method of the invention is input. At 102, data extrapolation and tapering are performed; these steps are necessitated by the particular Fourier-transformation process used in the preferred emodiment, and will be discussed in detail below. At 104, the Fourier transform of the data is calculated, to transform the values of magnetic intensity, recorded as a function of x and y, i.e., the locations on the surface of the earth at which particular measurements are made, into wave number domain versions of the same. Filtering may be performed at 106, for example, to remove high frequency noise. At 108, the reduction-to-the-equator transfer function is calculated. This step is discussed immediately hereafter. At 110 the transfer function is applied to the data. At 112, the inverse Fourier transformation is applied to the data transforming it back into values for magnetic intensity expressed as a function of position on the surface of the earth; the values may then be output in any desired manner at 114.

The reduction-to-the-equator transfer function is derived as follows.

Reproducing the equation of the Fourier-transformed version of the total field F(u,v) of equation (4) again as equation (7) for simplicity, we have $$F(u,v) = 2\pi |I_p|(liu+miv+ns)(Liu+Miv+Ns) \cdot \quad (7)$$

$$\frac{1}{s} \int \int \int e^{-(sh+iu\alpha+\beta iv)} d\alpha d\beta dh$$

Now, in the reduction-to-the-pole method where I, the inclination, is 90° and D, the declination, is 0°, the cosine of the inclination is zero. Substituting this value into the definitions of l, L, m, M, n and N (as defined in connection with equation (1) above), the first line of this expression reduces to $s^2$, which is combined with the second line to yield the expression defined by equation (5). Since the reduction-to-the-pole operator H(u,v) is equal to $F_p(u,v)/F(u,v)$, the reduction-to-the-pole operator H(u,v) is that shown in equation (6).

In the reduction-to-the-equator case, the inclination and declination are both equal to zero, so that both cos (I) and cos (D) are equal to 1, while sin (I) and sin (D) equal zero. Since l and L are defined as cos (I) cos (D), both are equal to 1, while M, m, N and n, which contain sine terms, are all equal to zero, yielding a value for the first line of the total field F(u,v), shown by equation (7), of $-2\pi u^2$. Accordingly, the total field of a Fourier-transformed version of a magnetic anomaly at the equator $F_e(u,v)$ can be expressed as shown in equation (8):

$$F_E(u,v) = -|I_p|2\pi \frac{u^2}{s} \int \int \int e^{-(sh+iu\alpha+\beta iv)} d\alpha d\beta dh \quad (8)$$

Finally, once again defining the reduction to the equator operator $H_E(u,v)$ as equal to $F_E(u,v)/F(u,v)$ we have the following expression for $H_E(u,v)$:

$$H_E(u,v) = \frac{-u^2}{(liu + miv + ns)(Liu + Miv + Ns)} \quad (9)$$

According to this equation, therefore, to reduce magnetic anomaly data to its version at the equator so that the negative-going trends in the magnetic data are centered with respect to the geographic anomalies which produce them, one simply needs to calculate the expression given by equation 9, using the L, M and N values recorded at the location of interest for those terms and for l, m and n, respectively. Values for u and v are calculated in the Fourier transformation process, while $s=(u^2+v^2)^{\frac{1}{2}}$. The transfer function defined by this operator is applied to the Fourier transformed data F(u,v). The result is then $F_E(u,v)$, the reduced-to-the-equator version of the Fourier-transformed data. This data can then be operated upon according to the inverse transformation and plotted to yield a map which shows the geologic anomalies in their correct positions.

It will be appreciated, however, by comparing FIGS. 2a and 2e, that a geologic anomaly involving additional magnetic material produces a lowering in the magnetic field recorded at the equator, as compared to the increase in the field recorded at the pole. Geophysicists are accustomed to seeing high values of magnetic field in the vicinities of geologic anomalies of increased magnetism, because they are used to magnetic exploration at high latitudes coupled with reduction-to-the-pole processing. Accordingly, it is desirable that the magnetic data generated by use of equation (9) be inverted so that peaks in the magnetic field correspond with inclusions of magnetic material rather than the inverse. This can be simply accomplished according to the present invention simply by removing the minus sign from the $-u^2$ term at the top of the operator defined by equation (9) prior to inverse transformation and plotting of the data. The thus "flipped" operator is expressed by equation (10), which therefore defines the transfer function which is used in useful practice of the invention for reduction of magnetic anomaly data to the equator.

$$H_E(u,v) = \frac{u^2}{(liu + miv + ns)(Liu + Miv + Ns)} \quad (10)$$

Figure 5:
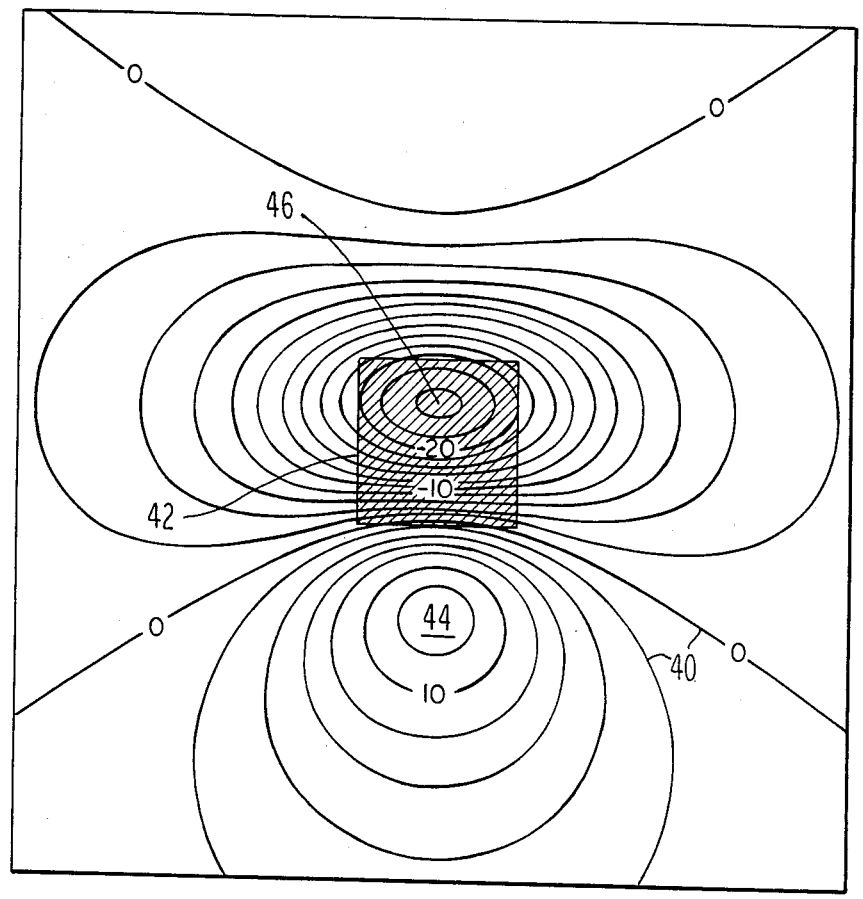
FIG. 5 shows a diagram of the magnetic field anomaly expected to result from a theoretical geologic anomaly at 15° of magnetic latitude.
Figure 6:
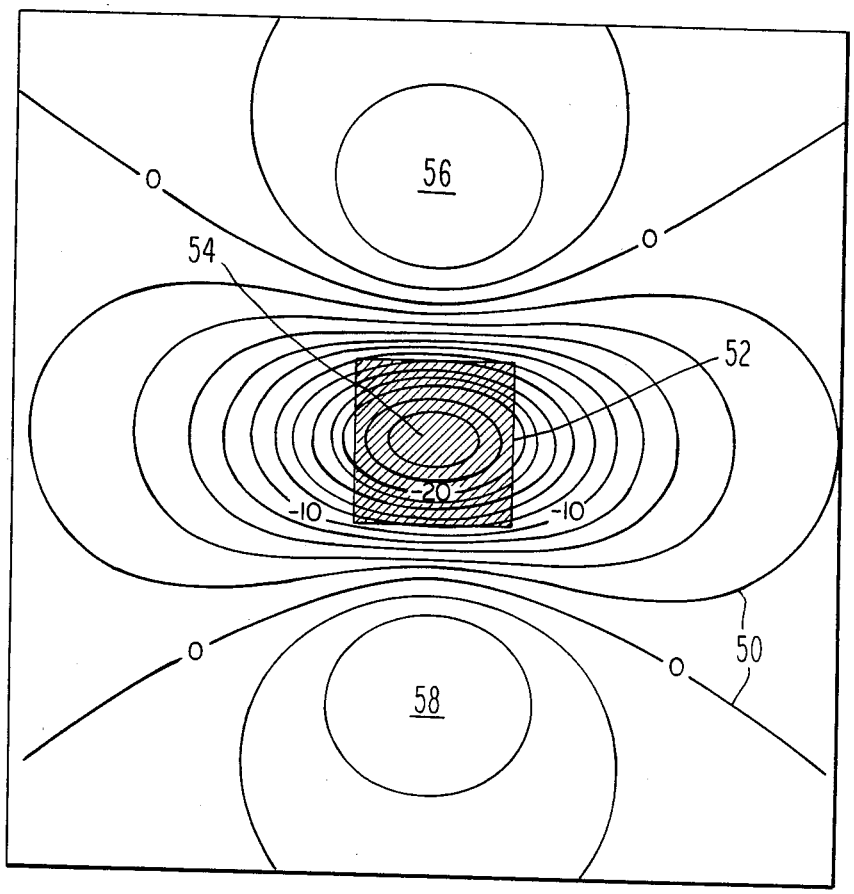
FIG. 6 shows a comparable diagram for the magnetic anomaly of a theoretical geologic anomaly at the equator.
Figure 7:
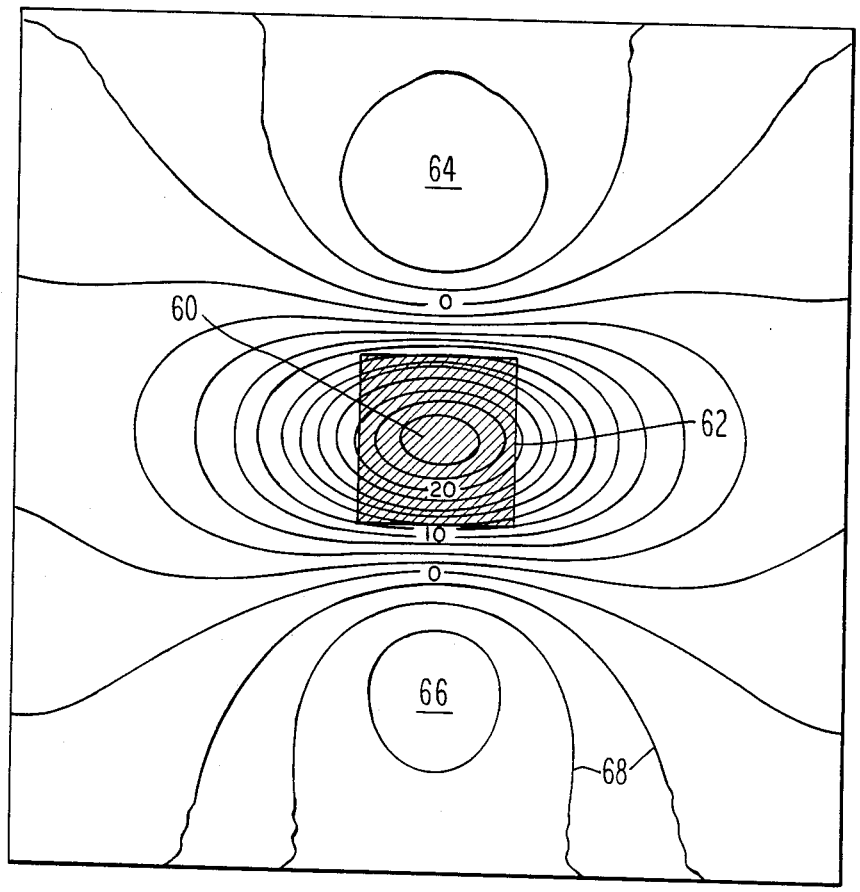
FIG. 7 shows the comparable diagram of the anomaly of FIG. 5 having been reduced to the equator according to the method of the invention.
Figure 8:
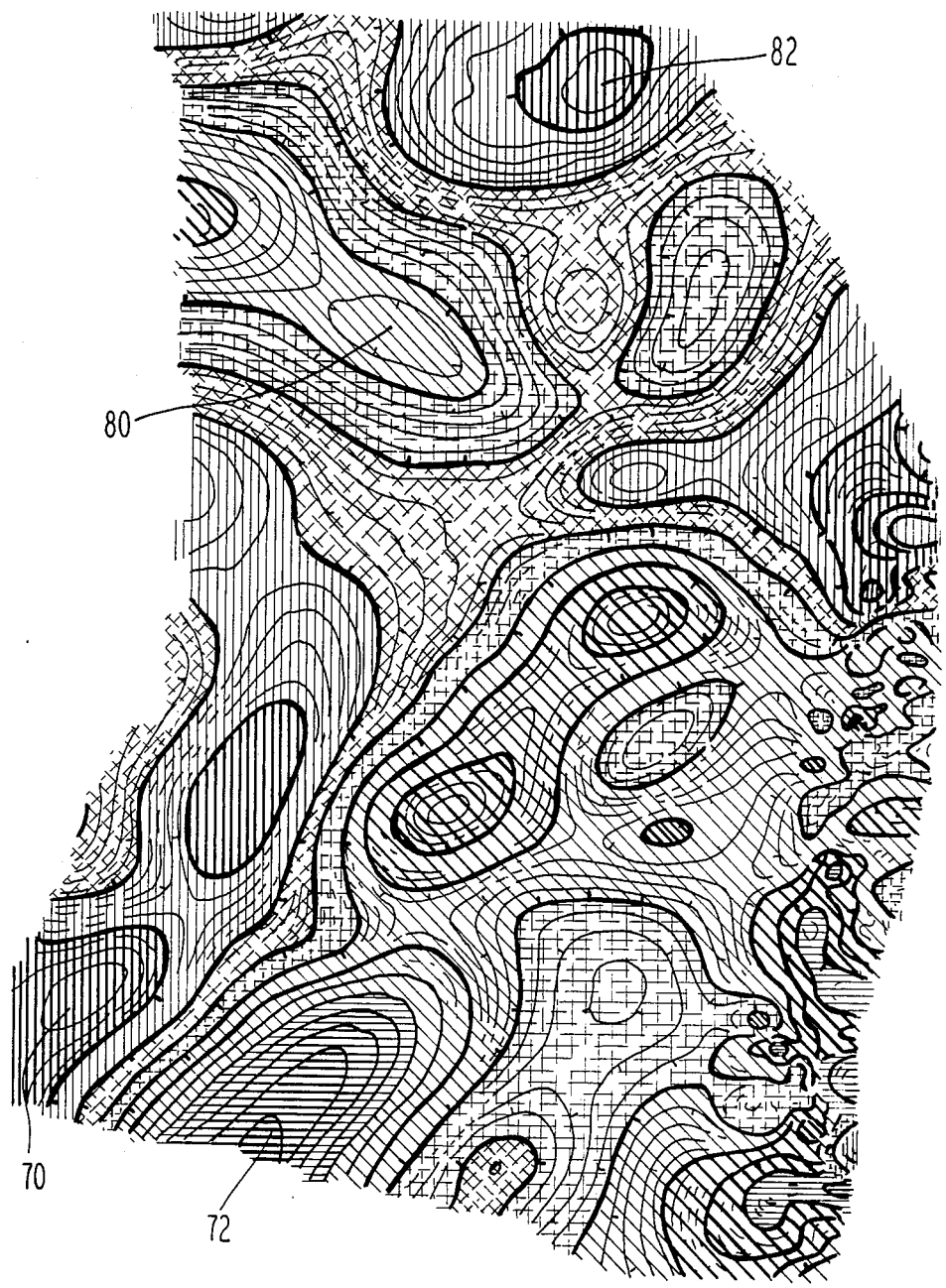
FIG. 8 shows actual magnetic data recorded at a magnetic latitude of approximately 20°.
Figure 9:
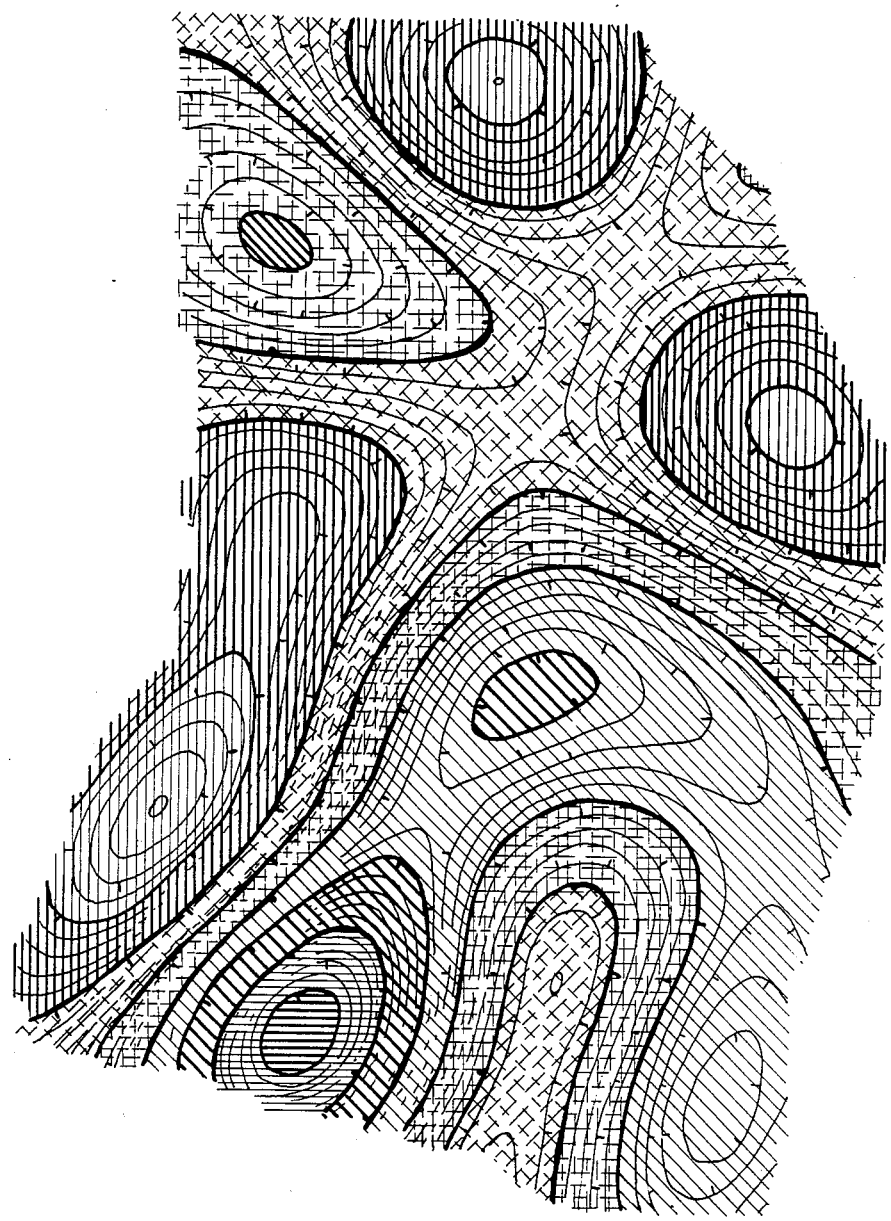
FIG. 9 shows the map of FIG. 8 having been filtered to eliminate high frequency components.
Figure 10:
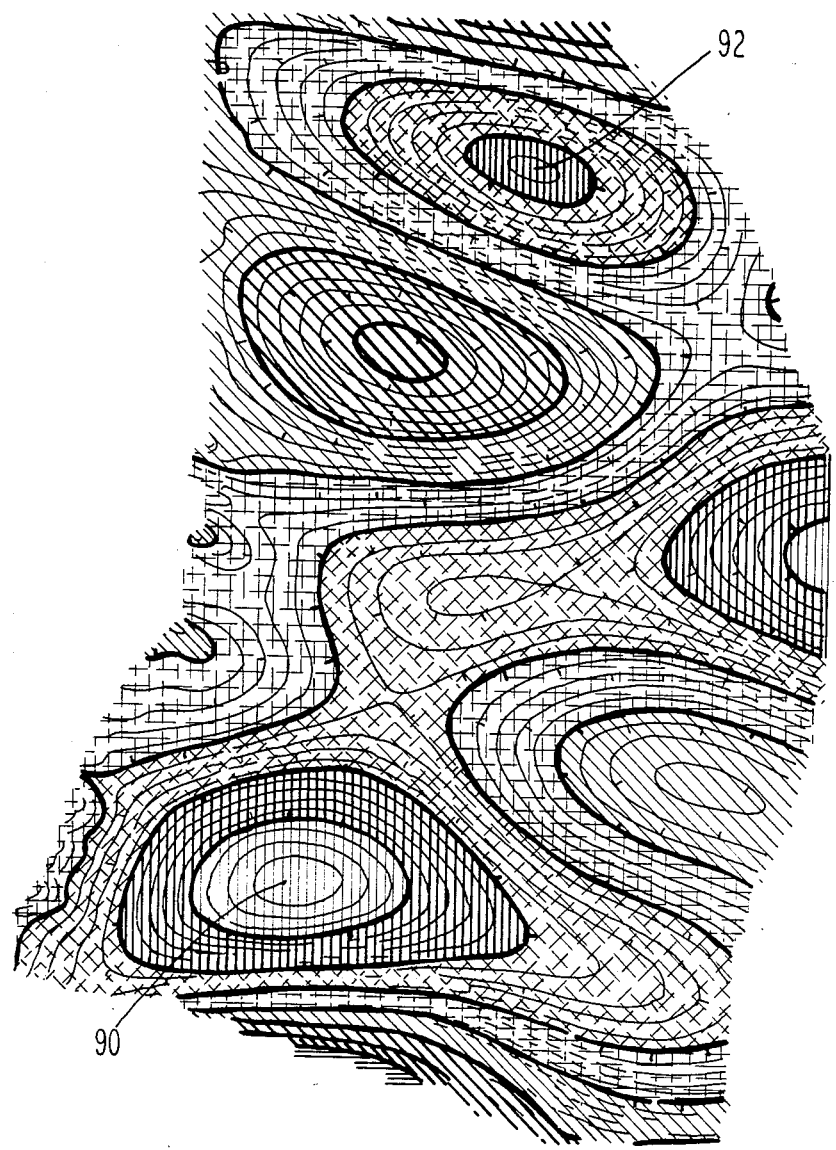
FIG. 10 shows the data of FIG. 9 having been reduced to the equator according to the invention.

The set of six figures which follow give examples of the methods of operation of the invention. FIGS. 5, 6 and 7 relate to an idealized prismatic body whereas FIGS. 8, 9 and 10 show examples of the method of the invention applied to real data.

FIG. 5 shows lines of equal magnetic intensity 40 which could be expected to be recorded with respect to a regular cubic body 42 of magnetic material located at latitude 15° magnetic, where I=15°. In the example given, the declination D is assumed to be 0°. It will be observed that the body 42 produces a peak at 44 and a trough at 46 just as indicated by FIG. 2d. The body is located more closely to the trough 46 than to the peak 44. As noted, the lines 40 represent contours of equal magnetic intensity; the small numbers shown give their intensity relative to a base line, ambient field level.

FIG. 6 shows the magnetic contour lines 50 which would be expected to be recorded with respect to a similar regular cubic body of magnetic material 52 located at the equator, where both inclination and declination are equal to zero. Again, as predicted by FIG. 2e, there is a trough of magnetic intensity 54 located directly over the prismatic body, and much weaker positive peaks are located on either side as at 56 and 58. The numbers indicating the relative value of intensity shown by the contours here correspond to FIG. 2e; that is, the trough is located over the anomaly 52, as the data would be recorded. It will be appreciated by those skilled in the art that simply by reversing the signs of the numbers indicating the relative magnetic field values of the contour lines, this trough could be transformed into a peak so as to correspond more closely to the conventional representation of the magnetic field's peaking in the vicinity of the geometric anomaly as occurs at higher latitudes, and shown by FIG. 2a.

FIG. 7 shows the magnetic anomaly of FIG. 5 after having been operated upon according to the reduction-to-the-equator operator defined by equation (10) above. It will be appreciated that this figure is quite close to that of FIG. 6; the only distortion is some minor fringing effects around the edges. However, the peak 60 is very nicely located over the prismatic body 62 and the troughs 64 and 66 are of the correct general magnitude. As will be appreciated the numbers indicating the relative intensity values shown by the magnetic contours 68 of this figure increase to the peak. This is in accordance with the flipping performed by removing the negative sign from the operator shown in equation (9) to generate that of equation (10), as discussed above. This yields a more readily understandable picture of the magnetic basement, which is the goal of such reduction-to-the-equator methods.

As discussed above in connection with FIG. 2, the shape of a magnetic anomaly recorded with respect to a geologic anomaly at the magnetic equator is not the precise inverse of a similar measurement made at the magnetic pole, because the field recorded at the equator has positive-going energy on either side of the primarily negative anomaly. Therefore, the performance of the reduction-to-the-equator method according to the invention does not yield a "picture" which is precisely analagous to that yielded by reduction-to-the-pole methods of the prior art. Accordingly, any point shown to be of high magnetic field should be understood to have been depicted as having a nonexistent region of negative magnetic field of relatively low intensity around it, and this should be considered in interpretation of the results.

As noted above, FIGS. 8 through 10 show similar operations performed with respect to real magnetic data. These figures are redrawn versions of computer-plotted magnetic data. The computer plots are done in color, to aid readability, and the actual colors used are indicated by the cross hatching patterns employed, in accordance with the Patent and Trademark Office's rules. Generally the colors go from red, as in the peak area 70 of FIG. 8, to blue, as in the trough 72. The lines shown are of equal magnetic intensity and the stub lines generally perpendicular to the contour lines extend in the direction of decreasing magnetic field.

FIG. 8 shows magnetic data recorded in a continental shelf area of magnetic latitude 20° N. The area shown in the figure is approximately 200 miles east to west and 300 miles north to south. The area toward the right side of the figure exhibiting a great number of irregularities is located along a shore line. It will be appreciated that this data shows numerous doublet pairs as at 70 and 72 and 80 and 92, comparable to the pairs of FIG. 2(d).

As discussed above, processing of data of this kind is typically done in the wave number domain. Accordingly, the Fourier transform of the data is first calculated so that subsequent processing operations are then carried out in the frequency domain. For example, a high cut filter may be applied directly to the data by multiplying the higher frequency components by gradually decreasing coefficients to yield a filtered version of the data of FIG. 8, as shown in FIG. 9. It will be appreciated that the high frequency components have been removed, including loss of some of the smaller features, in the interest of more clearly showing trends in the data.

Application of the operator defined by equation (10) to the data shown in FIG. 9 yields the reduced-to-the-equator version of the data shown in FIG. 10. It will be appreciated that the double features 70 and 72, 80 and 82 shown in FIGS. 8 and 9 have become single features such as 90 and 92 of FIG. 10 in accordance with the transformation between the figures such as 2d, which corresponds to FIGS. 8 and 9, to FIG. 2e, which corresponds to FIG. 10.

As discussed above, FIG. 4 shows a flowchart of the steps performed in the practice of the method of the invention. Data is input at 100. Typically, this data will comprise a matrix of numbers corresponding to the intensity of the earth's magnetic field measured at spaced locations in a rectangular or square array on the earth's surface. Ordinarily, the mean of the values is substracted from each, so that each value in the matrix represents the departure of the field in either the positive or negative direction from the mean.

As discussed above, the best way of performing reduction-to-the-equator processing according to the invention is by mathematical operation on the data in the wave number or frequency domain. Typically, to transform actual data expressed as a function of x and y into data expressed as a function of frequencies u and v one applies one of a plurality of well known Fourier transform methods. The Fourier transform presently of choice is the so-called Cooley-Tukey algorithm for the "fast Fourier transform." This method is well documented in the art (see generally, Brigham, *The Fast Fourier Transform*, Prentice-Hall (1974)) and requires no further discussion here, other than to point out that it operates on data points in square arrays, each dimension of the array having $2^n$ elements. Accordingly, if one's data is selected frotm a square array 50 kilometers on each side, taken at measurement points spaced a kilometer from one another, one has 50 by 50 array of data points. If it is desired to use the Cooley-Tukey algorithm, an array of $2^n$, i.e., 32 by 32 or 64 by 64 points is required. As is well known in the art, an array can be expanded by extrapolation of the data around its edges so as to smoothly curve-fit the data to zeroes at the edges of the 64 by 64 array. The forcing of the edge values to zero or "tapering" is desirable to avoid edge effects. As is well understood, frequency domain analysis of data points involves calculating the correlation between successive ones of the data points and determining the frequencies of sine waves which can be combined to yield those data points. If one has a high value at an edge of a data array, clearly inaccurate high frequency values will be present in the Fourier-transformed version of this data. Accordingly, at step 102, data extrapolation and tapering is applied to the data points so that the Cooley-Tukey algorithm can then be used in succeeding steps. Preferably, the tapering shown is performed using the well understood Hanning window method. Cosine tapering, also well understood in the art, which involves causing the points added by extrapolation to fit along a cosine curve going to zero at the edge of the array, may also be used.

One can then, at 104, calculate the Fourier transform of the data as discussed above. As noted, in the preferred embodiment, this is done using the Cooley-Tukey algorithm for fast Fourier transforms.

At 106 filtering may be performed as was discussed above in connection with the transformation from FIGS. 8 to 9. High frequency noise found in the data due to magnetic anomalies not of geologic interest can thus be avoided. Such filtering operations are well understood in the art; see Hamming, *Digital Filters*, Prentice-Hall, 1977.

One then computes the transfer function $H_E(u,v)$ at 108 as defined by equation (10) above, and applies this transfer function to the Fourier-transformed version of the data at 110. One can then apply the inverse Fourier transform at 112, yielding values comparable to the magnetic field of the earth values input at 100, and can display this data at 114 in any suitable form, such as the displays of FIGS. 8 through 10. Various ways of carrying out this display step are well understood in the art and form no part of the present invention.

Those skilled in the art will recognize that there has been described a method for reprocessing of magnetic data so as to reduce the magnetic anomaly recorded to the shape it would have if recorded with respect to a geologic anomaly at the equator and that this method will be of utility in reduction of all forms of magnetic data recorded within about 25° latitude from the magnetic equator. Further, it will be realized that numerous modifications and improvements can be made to the method of the invention without departing from its essential spirit and scope which therefore should not be considered to be limited by the above exemplary disclosure, but only by the following claims.

I claim:

1. The method of geophysical exploration of a magnetic anomaly caused by a geologic anomaly in the subsurface of the earth comprising:
    measuring the magnetic intensity at spaced locations on the surface of the earth over said geologic anomaly;
    correcting the measurements of magnetic intensity to values of magnetic intensity for locations on the magnetic equator of the earth; and
    plotting the corrected measurements of magnetic intensity, representative of the shape of said geologic anomaly.

2. The method of claim 1 wherein said step of correcting the measurements of magnetic intensity to values of magnetic intensity for locations on the magnetic equator of the earth comprises the steps of:
    selecting a transfer function for conversion of said measurements of said magnetic intensity to values which said measurements would have had if recorded with respect to a similar geologic anomaly located at the magnetic equator of the earth.

3. The method of claim 2 wherein said step of correcting the measurements of magnetic intensity is performed in the wave number domain, wherein said measurements are Fourier-transformed into wave number domain versions of said measurements, prior to application of said transfer function thereto.

4. The method of claim 2 wherein said transfer function $H_E(u,v)$ is defined as:

$$H_E(u,v) = \frac{u^2}{(liu + miv + ns)(Liu + Miv + Ns)}$$

where
    $l = \cos(I)\cos(D) = L$;
    $m = \cos(I)\sin(D) = M$;
    $n = \sin(I) = N$;
    $s = (u^2 + v^2)^{\frac{1}{2}}$;
    $I$ = inclination of the earth's magnetic field; and
    $D$ = declination of the earth's magnetic field.

5. The method of reduction to the equator of anomalies in the magnetic field of the earth comprising the steps of:
    measuring the intensity of the earth's magnetic field at spaced locations in a rectangular array on the surface of the earth;
    calculating Fourier-transformed versions of the measured values;
    computation of a transfer function in the wave number domain calculated using values for the earth's magnetic field at the locations at which said measurements are made;
    application of said transfer function to said Fourier-transformed versions of said measurements; and
    application of the inverse Fourier transform to the data having been operated upon according to said transfer function, whereby said measured values are corrected to reflect the actual shape of the geologic body producing said magnetic anomalies.

6. The method of claim 5 wherein the transfer function $H_E(u,v)$ applied to said Fourier transformed data takes the form $$H_E(u,v) = \frac{u^2}{(liu + miv + ns)(Liu + Miv + Ns)}$$

where
    $l = \cos(I)\cos(D) = L$;
    $m = \cos(I)\sin(D) = M$;
    $n = \sin(I) = N$;
    $s = (u^2 + v^2)^{\frac{1}{2}}$;
    $I$ = inclination of the earth's magnetic field; and
    $D$ = declination of the earth's magnetic field.

7. Process for exploration of the subsurface configuration of the earth comprising the steps of:
    measuring the earth's magnetic field at spaced locations on its surface;
    examining the measured values for the earth's magnetic field thus recorded to locate anomalies in the earth's magnetic field, said anomalies generally corresponding to geologic anomalies in the earth's subterranean structure; and
    where said locations are generally within about 20° latitude from the magnetic equator of the earth, reducing said values to the equator, said step of reducing comprising:
    calculation of a transfer function whereby said values measured for one of said magnetic anomalies are corrected to reflect the inclination and declination of the earth's magnetic field at the location of said geologic anomaly; and
    applying said transfer function to said magnetic anomaly values, whereby said magnetic anomaly values are reduced to correspond to the values which would have been recorded had said geologic anomaly been located in the vicinity of the earth's magnetic equator.

8. The method of claim 7 wherein said transfer function is in the wave number domain and said application of said transfer function to said values is performed in the wave number domain, said values having been operated upon by a Fourier transform process prior to application thereto of said transfer function.

9. The method of claim 8 further comprising the step of generating a map of the subterranean structure of the earth based on said reduced magnetic anomaly measurements, whereby magnetic maxima and minima in said map correspond to the locations of said geologic anomalies in the earth's subterranean structure.

10. The method of claim 8 wherein said transfer function $H_e(u,v)$ has the form $$H_E(u,v) = \frac{u^2}{(liu + miv + ns)(Liu + Miv + Ns)}$$

where l = cos (I) cos (D) = L;
m = cos (I) sin (D) = M;
n = sin (I) = N;
s = $(u^2+v^2)^{\frac{1}{2}}$;
I = inclination of the earth's magnetic field; and
D = declination of the earth's magnetic field.

* * * * *